United States Patent
Martenson et al.

(10) Patent No.: US 8,331,603 B2
(45) Date of Patent: Dec. 11, 2012

(54) HEADSET

(75) Inventors: Rasmus Martenson, Kauniainen (FI); Niko Eiden, Espoo (FI)

(73) Assignee: Nokia Corporation, Espoo (FI)

( * ) Notice: Subject to any disclaimer, the term of this patent is extended or adjusted under 35 U.S.C. 154(b) by 1159 days.

(21) Appl. No.: 11/212,410

(22) Filed: Aug. 26, 2005

(65) Prior Publication Data

US 2007/0003098 A1   Jan. 4, 2007

Related U.S. Application Data

(60) Provisional application No. 60/687,067, filed on Jun. 3, 2005.

(51) Int. Cl.
*H04R 25/00* (2006.01)

(52) U.S. Cl. .......... 381/379; 381/74; 381/367; 381/370; 381/374; 381/376; 381/390; 379/430

(58) Field of Classification Search .............. 381/74, 381/367, 380, 370, 381, 390, 384, 374, 376, 381/379; 455/575.1–575.2, 575.6, 569.1–569.2, 455/41.2; 379/430
See application file for complete search history.

(56) References Cited

U.S. PATENT DOCUMENTS

| 4,987,592 A | 1/1991 | Flagg |
| 5,369,857 A | 12/1994 | Sacherman et al. |
| 5,504,812 A | 4/1996 | Vangarde |
| 5,673,325 A | 9/1997 | Andrea et al. |
| 6,768,804 B1 * | 7/2004 | Isvan .............................. 381/376 |
| 6,775,390 B1 | 8/2004 | Schmidt et al. |
| 7,146,004 B2 * | 12/2006 | Bodley et al. ................. 379/430 |
| 2002/0009191 A1 | 1/2002 | Lucey et al. |
| 2002/0067825 A1 * | 6/2002 | Baranowski et al. ......... 379/430 |
| 2002/0132585 A1 | 9/2002 | Palermo et al. |
| 2004/0001588 A1 * | 1/2004 | Hairston ....................... 379/419 |
| 2004/0052364 A1 | 3/2004 | Bodley et al. |
| 2004/0116068 A1 * | 6/2004 | Thompson et al. .......... 455/3.01 |
| 2004/0165720 A1 | 8/2004 | Paulson et al. |
| 2004/0229658 A1 | 11/2004 | Kim et al. |
| 2005/0070343 A1 * | 3/2005 | Janninck et al. ........... 455/575.1 |
| 2005/0089185 A1 * | 4/2005 | Allen ............................ 381/370 |
| 2005/0129259 A1 | 6/2005 | Garner |
| 2005/0181828 A1 * | 8/2005 | Silfverberg ................... 455/557 |
| 2006/0019729 A1 * | 1/2006 | Harris ........................ 455/575.6 |
| 2006/0140435 A1 * | 6/2006 | Sheehy et al. ................. 381/390 |

FOREIGN PATENT DOCUMENTS

| CN | 1129877 A | 8/1996 |
| EP | 0595457 | 5/1994 |
| EP | 0 690 654 | 1/1996 |

(Continued)

OTHER PUBLICATIONS

Supplementary European Search Report of EP Application No. 06710980—Date of Completion of Search: Jun. 25, 2008.

(Continued)

*Primary Examiner* — Disler Paul
(74) *Attorney, Agent, or Firm* — Locke Lord LLP

(57) ABSTRACT

A wireless headset comprises a body portion and a boom pivotably coupled to the body portion. The boom is resiliently biased from a first position towards a second position relative to the first headset portion. The headset includes a sensor for detecting movement of the boom between the second to the first position.

30 Claims, 8 Drawing Sheets

FOREIGN PATENT DOCUMENTS

| | | |
|---|---|---|
| EP | 1280319 | 1/2003 |
| EP | 1530348 | 5/2005 |
| GB | 2 294 177 | 4/1996 |
| GB | A-2294177 | 4/1996 |
| WO | WO 9903294 | 1/1999 |
| WO | WO 0119054 | 3/2001 |
| WO | WO 2004093490 | 10/2004 |

OTHER PUBLICATIONS

International Search Report of PCT/IB2006/050614—Date of Completion of Search: Sep. 8, 2006.
International Search Report of PCT/IB2006/051764—Date of Completion of Search: Sep. 18, 2006.

\* cited by examiner

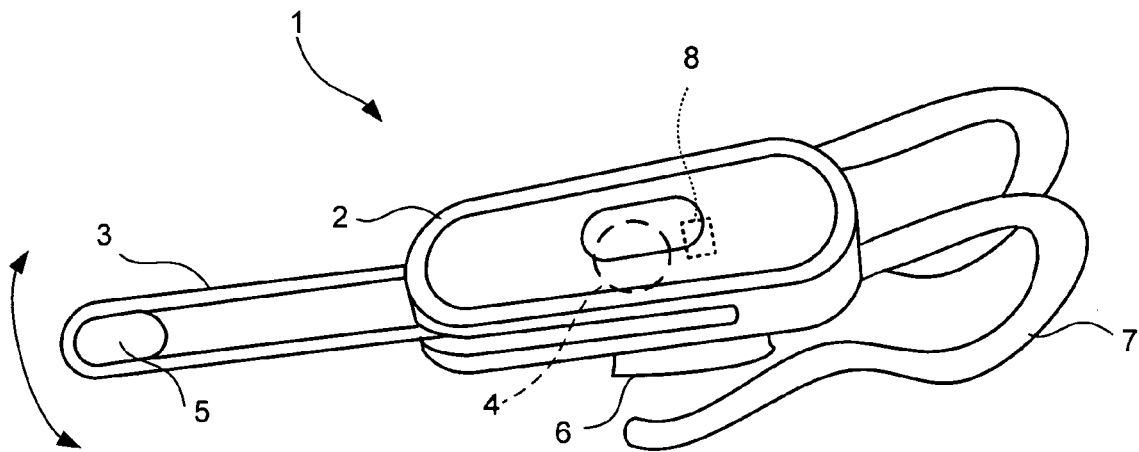
Fig. 1
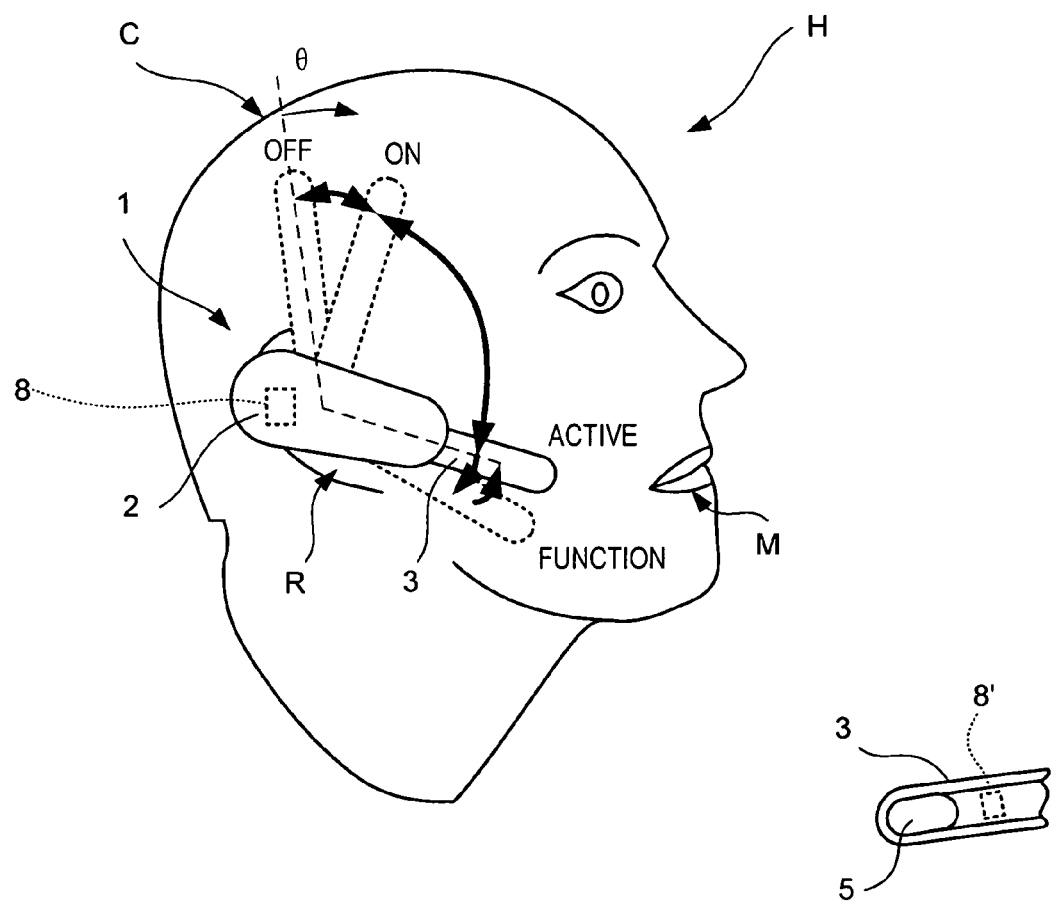
Fig. 2                    Fig. 2a

| 31 | 32 |
|---|---|
| 1000000000000000 | 0001 |
| 1100000000000000 | 0001 |
| 1110000000000000 | 0001 |
| ... | ... |
| 1010000000000 | 0010 |
| 1101000000000 | 0010 |
| ... | ... |

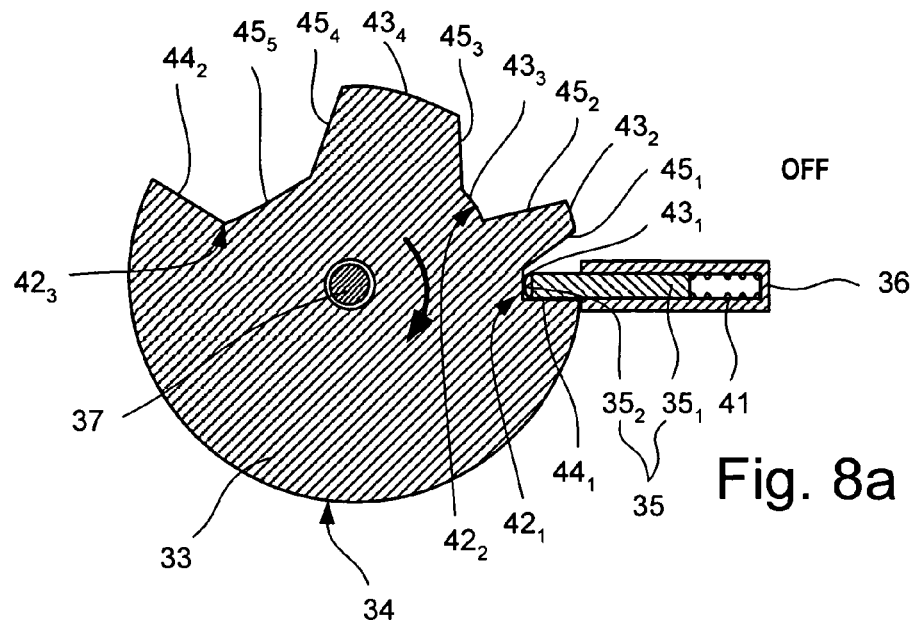
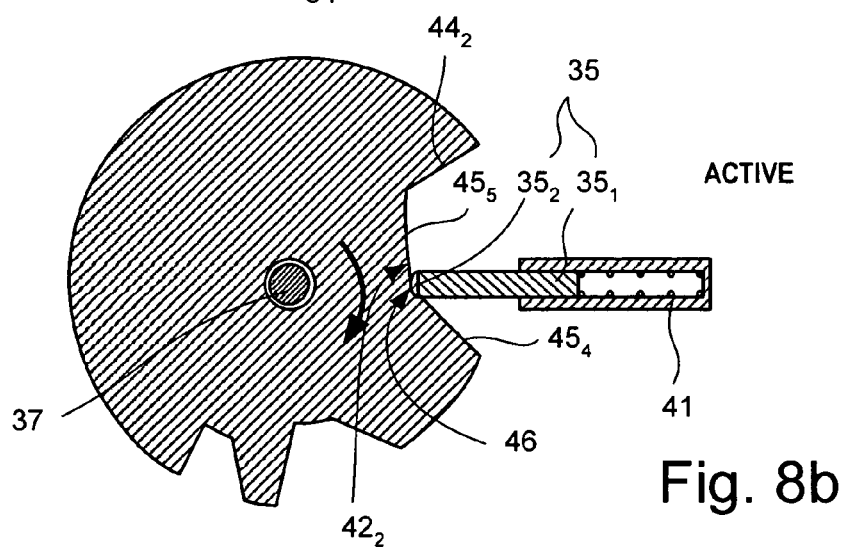
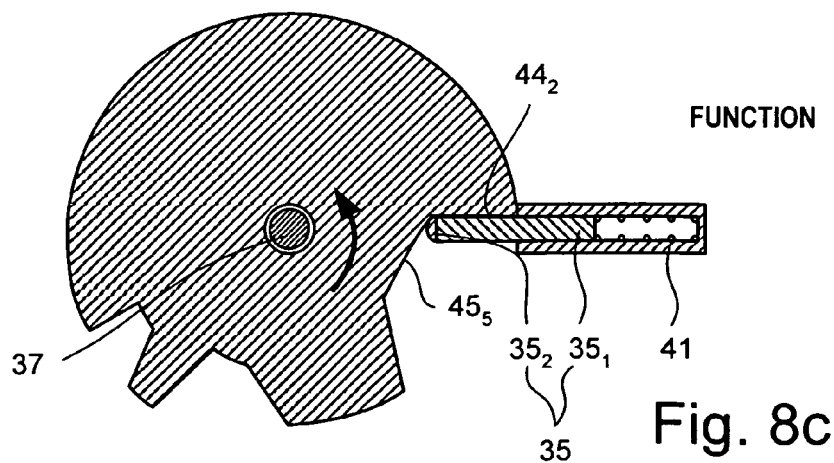

HEADSET

The present application claims the benefit under 35 U.S.C. §119(e) of provisional application No. 60/687,067 filed Jun. 3, 2005.

FIELD OF THE INVENTION

The present invention relates to a headset.

BACKGROUND OF THE INVENTION

Headsets are used in a variety of applications, such as telephone communications, artistic performances and dictation. Such headsets permit a user to speak into an input means, such as a microphone, or to listen to an audio output of a speaker without having to hold a device, such as a mobile telephone handset, in their hand. Furthermore, the use of a headset may allow a user to perform such applications without necessarily remaining stationary.

Recently, wireless headsets have become available. Such headsets may use wireless communication protocols, such as Bluetooth™, in order to transmit data to, and receive data from, an external device, such as a mobile phone.

Many prior art headsets comprise a body with attachment means allowing the headset to be clipped onto, or otherwise held in position over, a user's ear. A speaker is provided within the main body. A microphone is provided on a fixed boom which, in use, extends from the body to a position close to the user's mouth.

Some headsets include buttons that allow a user to perform call-related functions on their mobile telephone handset without the need to handle the handset. For example, a headset may include a volume control button, a call answer/end button and a Bluetooth™ pairing button. However, this type of user interface is difficult to use, especially when buttons are closely spaced. Furthermore, when wearing the headset, the user cannot see the buttons and so may not be able to locate a particular button, except by feeling their way around the headset or identify the function of a given button, except by pressing it.

The present invention seeks to ameliorate at least some of these problems.

SUMMARY OF THE INVENTION

According to a first aspect of the invention there is provided a headset comprising a first headset portion a second, elongate headset portion coupled to the first headset portion and resiliently biased from a first position towards a second position relative to the first headset portion and a sensor for detecting movement of the second headset portion between the second and the first position.

The user may find it easier to locate an elongate headset portion than a button and can conveniently enter a control signal, for example by singly or repeatedly tapping the elongate headset portion.

The second headset portion may be moveable to a third, unbiased position. The second position may be interposed between the first position and a third position. The second headset portion may be pivotably coupled to the first headset portion. The first headset portion may comprise a main body and the second headset portion may comprise a boom. The first headset portion may comprise an ear clip and the second headset portion may comprise a main body. A boom may be coupled to the main body. A boom may be fixedly connected to the main body. The sensor may be configured to detect intermediate positions between the first and second positions.

The headset may further comprise a controller arranged to receive a signal from the sensor. The controller may be arranged to determine a command corresponding to a pattern of movement of the second headset portion in dependence upon a signal. The headset may include a transceiver configured to transmit the command to another device. The headset may include a transceiver configured to transmit the signal to another device. The headset may comprise a controller for performing call-related functions in dependence upon movement of the second headset portion.

The headset may be in the form of headphones comprising a first headphone body for a first ear and a second headphone body for a second ear, wherein the first headphone body provides the first headset portion.

According to a second aspect of the invention there is provided a system comprising the headset and an external device operatively couplable to the headset.

The external device may be a mobile communications device.

According to a third aspect of the invention there is provided a headset comprising an elongate headset portion and a sensor for detecting physical manipulation of the elongate headset portion.

The user may find it easier to locate an elongate headset portion than a button and can conveniently enter a control signal, for example by touching or stroking the elongate headset portion.

The sensor may comprise a sensor for detecting application of a force. The sensor may comprise a touch sensor. A touch sensor may be a capacitive touch sensor. The headset may comprise a controller arranged to generate command signals based on the detected physical manipulation.

According to a fourth aspect of the present invention there is provided a method comprising detecting physical manipulation of an elongate headset portion; and generating a command signal dependent upon the detected physical manipulation.

Generating the command signal may comprise generating a command signal for performing a call-related function. Detecting physical manipulation of the elongate headset portion may comprise detecting movement of the elongate headset portion between a first position and a second position, for example detecting whether the elongate headset portion is in the second position. Detecting physical manipulation of the elongate headset portion may comprise detecting application of a force to the elongate headset portion. Detecting physical manipulation of the elongate headset portion may comprise detecting whether the elongate headset portion is being touched. The method may comprise characterising the detected physical manipulation and determining the user command based on the physical manipulation may comprise determining the user command based on a characterisation.

According to a fifth aspect of the invention there is provided a computer program comprising instructions which when executed by a processor causes the processor to generate a command signal dependent upon detected physical manipulation of an elongate headset portion.

According to a sixth aspect of the invention there is provided a computer program product storing thereon the computer program.

BRIEF DESCRIPTION OF THE DRAWINGS

Embodiments of the present invention will now be described, by way of example, with reference to the accompanying drawings, in which:

FIG. 1 is a perspective view of a first embodiment of a headset according to the present invention;

FIG. 2 shows schematically different positions of the boom of the headset shown in FIG. 1;

FIG. 2a shows part of another embodiment of a headset in which a sensor is provided in a boom;

FIG. 8a illustrates schematically a pivot mechanism in an OFF position;

FIG. 8b illustrates schematically the pivot mechanism shown in FIG. 8a in an ACTIVE position;

FIG. 8c illustrates schematically the pivot mechanism shown in FIG. 8a in a FUNCTION position;

FIG. 10c shows a front perspective view of the headset shown in FIG. 10a.

DETAILED DESCRIPTION OF THE INVENTION

Figure 3:
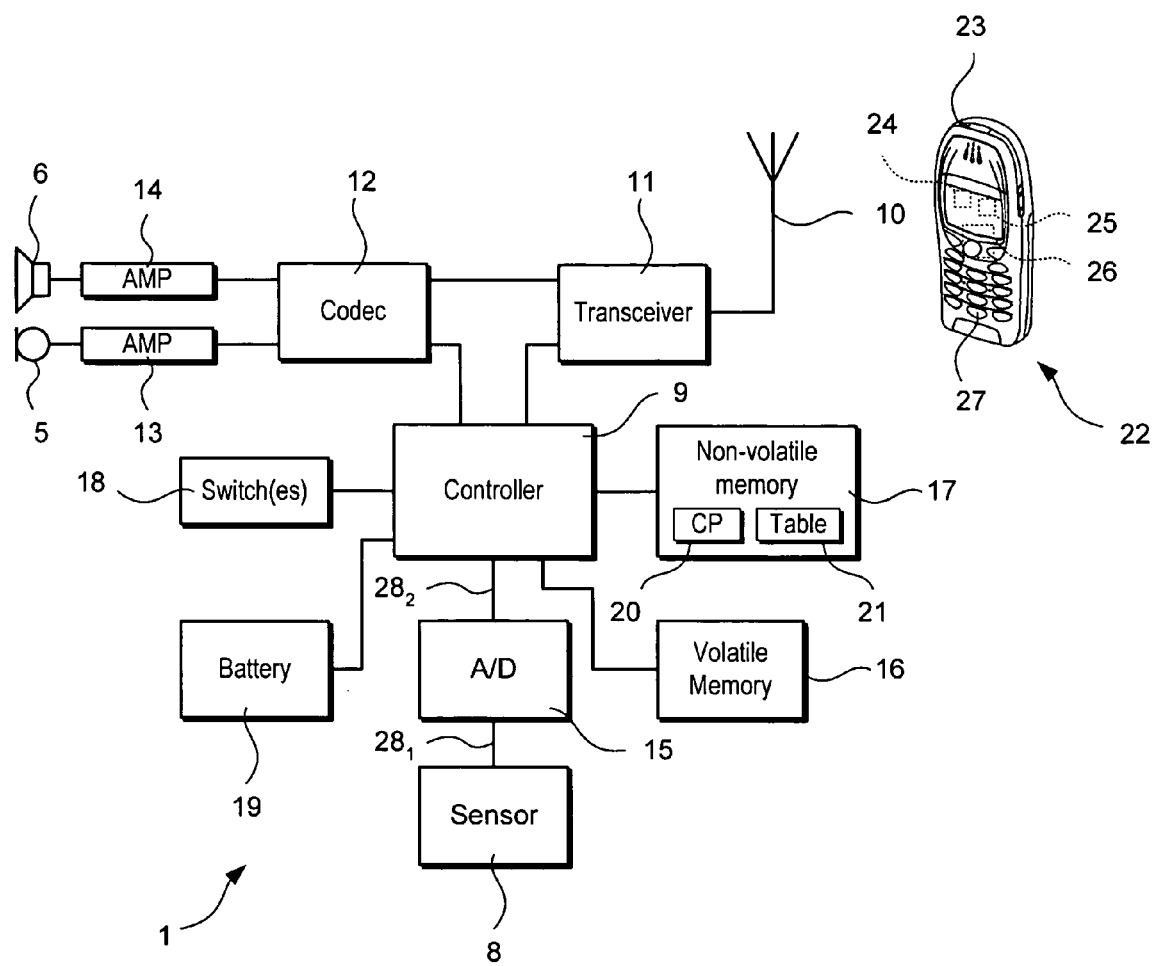
FIG. 3 is a schematic block diagram of circuitry of the headset shown in FIG. 1.

Referring to FIG. 1, a first embodiment of a headset 1 according to the present invention is shown. The headset 1 includes a main body 2, which provides a first headset portion, and a boom 3, which provides a second, elongate headset portion, and which is coupled to the main body 2. The boom 3 is coupled to the main body 2 by means of a pivot mechanism 4. The headset 1 includes a microphone 5 at a distal end of the boom 3, a speaker 6 provided in the main body 2 and an ear clip 7 provided by a pair of arms 7 attached to the main body 2. The ear clip 7 may be replaced by a headband (not shown) or other means (not shown) for attaching the headset 1 to a head H, or part of the head, of the user. The headset 1 includes a sensor 8 for detecting physical manipulation of the boom 3, for example movement of the boom 2 or application of force to the boom 3.

In other embodiments, the ear clip 7 or at least part of the attaching means (not shown) may provide the first headset portion and the main body 2 may provide the second headset portion. Thus, the boom 2 may be omitted and the microphone 5 may be mounted in or on the main body 2. Accordingly, the main body 2 may be pivotably coupled to the ear clip 7.

Referring also to FIG. 2, the second headset portion, in this case the boom 3, is moveable between first, second, third and fourth positions, relative to the first headset portion, which in this example is the main body 2. The first position is unstable and the second, third and fourth positions are stable. The first headset portion may be moveable between two positions, three positions or more than four positions and at least one of these positions may be stable and at least one of these positions may be unstable.

The first, second, third and fourth positions are hereinafter referred to as FUNCTION, ACTIVE, ON and OFF positions.

In FIG. 2, the headset 1 is shown removably attached to the right ear R. However, the headset 1 may be modified so that it is attachable to the left ear (not shown).

When the headset 1 is worn by the user, in the OFF position, the boom 3 generally points away from the mouth M of the user, for example upwards and backwards towards the crown C of the head, as shown in FIG. 2. The user may apply a turning force, for example by pulling, with their finger (not shown), the distal end of the boom 3 over the top of the main body 2. The user can rotate the boom 3 to the ON position. The user can rotate the boom 3 further until, in the ACTIVE position, the boom 3 generally points towards the mouth M of the user.

The user may apply further turning force to rotate the boom 3 to the FUNCTION position, for example by pulling the distal end of the boom 3 downwards. However, the boom 3 is resiliently biased from the FUNCTION position towards the ACTIVE position. Thus, if the user releases the further turning force, then the boom 2 springs back to the ACTIVE position. As will be explained in more detail later, the sensor 8 detects movement of the boom 3 between the ACTIVE and FUNCTION positions. Thus, the user can enter control signals or commands into the headset 1 by manipulating the boom 3, for example by tugging or tapping the boom 3.

In the example just described, the boom 3 rotates about a pivot in a plane. However, the boom 3 may be configured to rotate in alternative or additional planes. The boom 3 may be configured to rotate, slide or twist between other positions. Other first and/or second positions may be used. For example, when in the ACTIVE position, the boom 3 may be configured to be pushed towards or away from the cheek towards a FUNCTION position. Thus, the user can enter control signals into the headset 1 by pushing, pulling or twisting the boom 3. The headset 1 may be adapted such that more than one type of movement for entering control signals can be used, for example pulling down and pushing out, to respective first and second FUNCTION positions. Thus, one type of movement can be used for volume control and another type of movement can be used for controlling an application. It will be appreciated that the OFF, ON, ACTIVE and FUNCTION positions may lie at different positions to those shown in FIG. 2.

In some embodiments, the boom 3 may not be rotatable between the ACTIVE and FUNCTION positions. For example, the boom 3 may only be bendable. Alternatively, the boom 3 may not be moveable or deformable.

Referring to FIG. 2a, a sensor 8' may be provided, for example in the boom 3, for detecting other forms of physical manipulation, such as application of a force to the boom 3 and/or touch. The sensor 8' may take the form of a strain gauge or a touch sensor, such as a capacitive or inductive sensor. A touch sensor may detect proximity of, for example, a finger, without the finger actually touching the sensor. Thus, the user can enter control signals into the headset 1 by touching or stroking the boom 3 and/or by moving a finger close to the boom.

More than one sensor may be provided.

Referring again to FIG. 2, when the boom 3 is in the OFF position, the headset 1 does not consume power and does not communicate with an external device 22 (FIG. 3).

When the boom 3 is in the ON position, the headset 1 can communicate with the external device 22 (FIG. 3).

Moving the boom 3 from the ON position to the ACTIVE position can be used to provide a command for the headset 1 and/or the external device 22 (FIG. 3), such as a user input for an application. For example, the external device 22 (FIG. 3) may be a mobile telephone handset (also commonly referred to as a "cellular telephone") or other communications device.

Thus, if the mobile telephone handset 22 (FIG. 3) receives an incoming call, the user can accept the call by moving the boom 3 from the ON position to the ACTIVE position. Alternatively, the external device 22 (FIG. 3) may be personal computer running, for example a dictation, i.e. voice to text, application. Thus, the user can open a new window on a display and/or start the application, by moving the boom 3 from the ON position to the ACTIVE position When the boom 3 is in the ACTIVE position, the headset 1 may automatically provide a command on behalf of the user. Using the example of a mobile telephone handset 22 (FIG. 3), when the boom 3 is in the ACTIVE position, the headset 1 may automatically answer incoming calls received by the handset 22 (FIG. 3).

The user can move the boom 3 from the ACTIVE position to the FUNCTION position, for example by tapping the boom 3, to input a command, for example for performing a call-related function or for providing editing commands.

For example, if the headset 1 is in auto-answer mode, a user may hang up an automatically accepted call by tapping the boom 3 once. A user may redial a previously called number by tapping the boom 3 twice. Other functions may be used and other patterns of manipulation, such as taps, tugs or strokes of a finger, may be used.

Referring to FIG. 3, circuitry of the headset 1 is shown in schematic block form.

As described earlier, the headset 1 includes the microphone 5 for receiving audio input, the speaker 6 for providing audio output and the sensor 8. The headset 1 further includes a controller 9, an antenna 10, a transceiver 11, a voice coder/decoder 12 (hereinafter referred to as a codec), an amplifier 13 for the microphone 5, an amplifier 14 for the speaker 6, an analogue-to-digital (A/D) converter 15, volatile memory 16, non-volatile memory 17 and one or more optional push buttons or switches, such as a volume control button 18. The headset 1 is powered by a battery 19 which may be removable and/or rechargeable.

The non-volatile memory 17 stores a computer program 20, which is run by the controller 9, which controls operation of the headset 1, and a table 21.

The controller is operatively connected to the transceiver 11, codec 12, converter 15, memory 16, 17 and switches 18. The controller 9 is in the form of a microprocessor. However, more than one microprocessor may be used. The controller 9 includes an internal clock (not shown).

The transceiver 11 is configured to wirelessly transmit data to and receive data from an external device 22, for example using Bluetooth™ protocols. However, communication between the headset 1 and the external device 22 may be based on other wireless local area network (WLAN) or personal area network (PAN) protocols, such as IEEE 802.11x standards. The headset 1 may provide connectivity directly to a mobile communications network (not shown), for example based on 2G, 3G, 4G or later generation communications standards.

In this example, the external device 22 is mobile telephone handset having an antenna 23, a first transceiver 24 for communicating with the headset 1 and a second transceiver 25 for communicating with a mobile telecommunications network (not shown). The first and second transceivers 24, 25 may be provided by a single transceiver (not shown). The external device 22 includes a controller 26 and an input device 27.

The external device 22 may be another type of communication device, a content rendering device, such as MP3 player or DVD player, or a personal computer. The external device 22 need not provide connectivity to a mobile communications network.

Additionally or alternatively to the wireless link, the headset 1 and external device 22 may be configured to communicate via a wired link (not shown), such as universal serial bus (USB).

In this example, the sensor 8 is for detecting movement or a position of the boom 3. The sensor 8 outputs a signal $28_1$ to the A/D converter 15, which in turn outputs a digital signal $28_2$ for processing by the controller 9. The A/D converter may be integrated into the sensor 8 or the controller 9.

In this example, the sensor 8 is arranged to measure the position of the second headset portion, in this case the boom 3, with respect to the first headset portion, i.e. the main body 2. In particular, the sensor 8 outputs a voltage, V, as a function of angular rotation, θ. The output voltage V of the sensor 8 may vary monotonically with angular rotation θ of the boom 3.

Figures 6, 7:
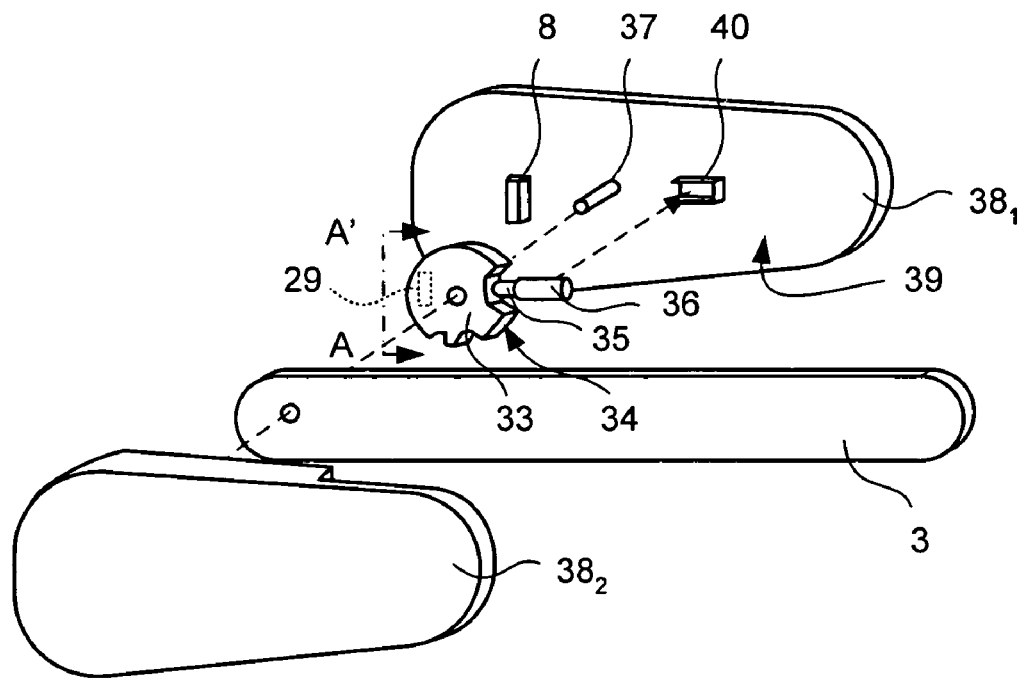
FIG. 6 shows an example of a table containing templates and corresponding commands.
FIG. 7 is an exploded view of the headset shown in FIG. 1.

In this example, the sensor 8 is a Hall sensor included in the main body 2. However, other types of magnetic sensor, such as a Hall switch, may be used. Other types of sensors may be used such as an electromechanical switch, variable potentiometer or optical sensor. The A/D converter 15 may be omitted, for example if a two-state switch is used instead of a sensor which outputs an analog signal. The sensor 8 or at least part of the sensor 8 may be mounted in the boom 2. The sensor 8 may be configured to detect plural intermediate boom positions, for example positions between the ACTIVE and FUNCTION positions and between OFF and ACTIVE positions (FIG. 2). In this example, the Hall sensor 8 measures a magnetic flux from a static micro-magnet 29 (FIG. 7).

The table 21 contains information relating to commands, in this example, call-related functions. The table 21 may be fully or partly preloaded into non-volatile memory 17 during manufacture or may be downloaded to the headset 1 during operation thereof. A user may amend, modify or update the table 21. For example, a user may wish to customize the headset 1.

The headset 1 may perform call-related functions itself, such as dialling.

Figure 4:
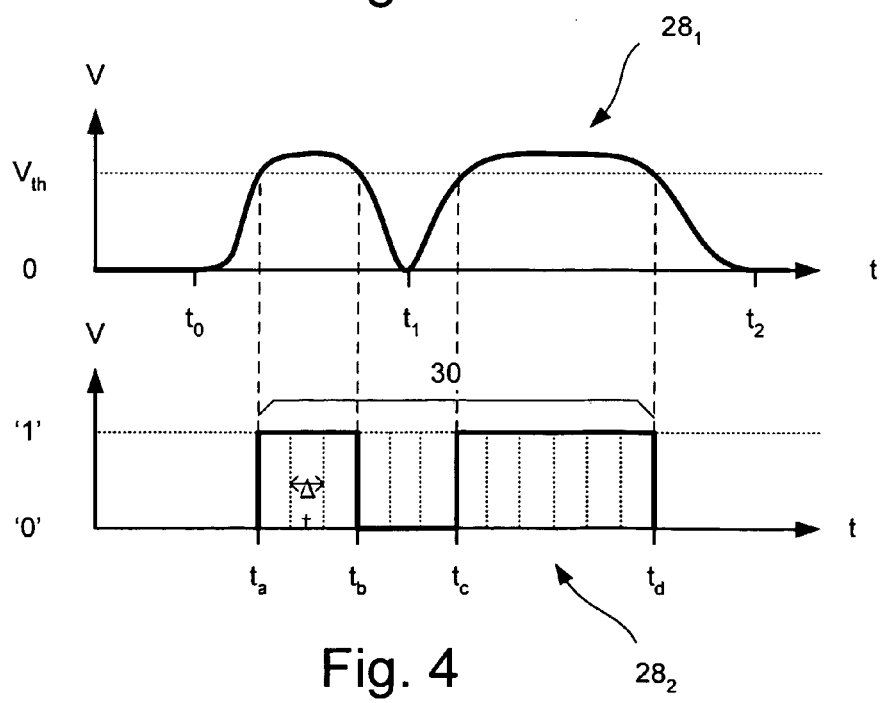
FIG. 4 shows an example of a signal output from a sensor and a corresponding digital signal.

Referring to FIGS. 2, 3 and 4, the sensor 8 outputs a signal $28_1$, the magnitude of which is dependent upon the position of the boom 3.

The sensor 8 is configured such that, when the boom 3 is in the ACTIVE position, the output voltage V across a pair of output terminals (not shown) of the sensor 8 is zero. As the boom 3 moves towards the FUNCTION position, the output voltage increases.

A threshold value $V_{th}$ is set corresponding to the FUNCTION position. The threshold value $V_{th}$ may be set in the A/D converter 13, such that when $V \geq V_{th}$ the output of the A/D converter 15 is '1' indicating that the boom 3 is at the FUNCTION position and when $V < V_{th}$ the output of the A/D converter 15 is '0' indicating that the boom 3 is at the ACTIVE position. The threshold value $V_{th}$ may be set by a manufacturer and/or may be altered by a user.

In FIG. 4, signal $28_1$ corresponds to the user tapping or tugging the boom 3 twice.

The sensor 8 measures displacement of the boom 3 which is reflected in signal $28_1$. The magnitude of the signal $28_1$ begins to rise from zero at $t_0$, then falls to zero and begins rising again at $t_1$, and finally returns again to zero at $t_2$. The magnitude of the signal $28_1$ rises and stays above $V_{th}$ between $t_a$ and $t_b$ and again later between $t_c$ and $t_d$. The sensor 8 supplies the signal $28_1$ to the A/D converter 15.

The A/D converter 15 samples and thresholds the signal $28_1$ and supplies a digitised signal $18_2$ to the controller 9. In this example, the sampling rate Δt is much greater than the duration of a typical tap, for example $t_a$-$t_b$. The signal $28_2$ includes a portion 30 corresponding to movement of the boom 3.

As mentioned earlier, a sensor may be used which outputs a digital signal.

Figure 5:
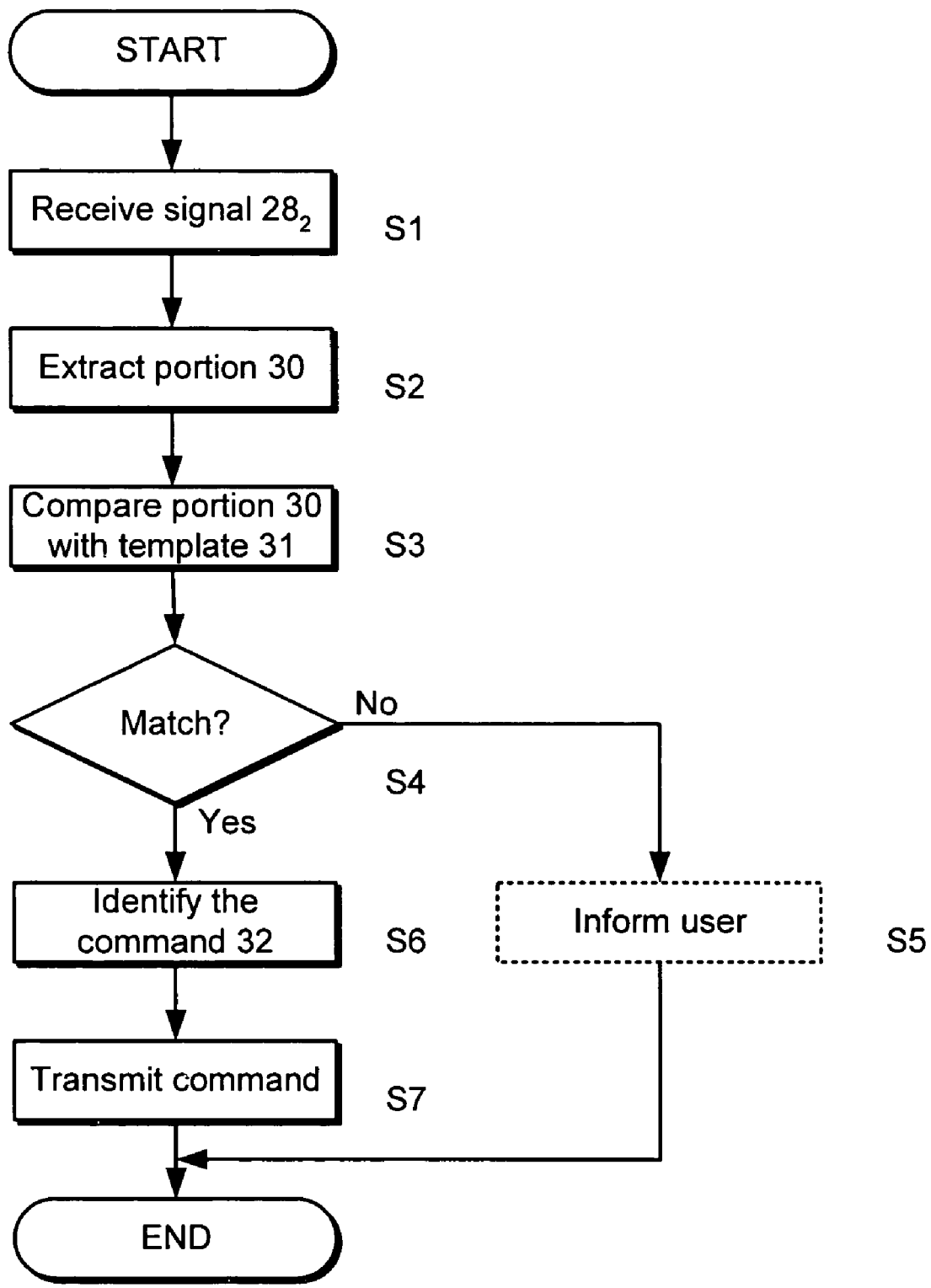
FIG. 5 is a process flow diagram of a method of identifying a command.

Referring to FIGS. 5 and 6, a method of identifying a command is shown. In this example, the command is to perform a call-related function for controlling a mobile telephone handset 22 (FIG. 3).

The controller 9 receives the signal $28_2$ from the A/D converter 15 (step S1) and identifies the portion 30 of the signal $28_2$ corresponding to movement of the boom 3. For example, the controller 9 may identify the signal portion 30 by identifying a leading edge and defining frame having a fixed duration (step S2). The leading edge may identified by determining when the signal $28_2$ changes from a long sequence of '0's to one or more consecutive '1's.

The controller 9 compares the signal portion 30 with templates 31 stored in table 21 corresponding to different movements of or applied forces to the boom 3 (step S3) and determines whether there is a match (step S4). If no match is found, the user may be informed (step S5), for example by an audible signal using the speaker 6. If a match is found, then the controller 9 reads out a corresponding command 32 (step S6). The controller 9 transmits the command 32 to the external device 22 (FIG. 3), for example for the device controller 26 (FIG. 3) to process (step S7). Alternatively, the controller 9 may process the command 32.

In this example, the templates 31 take the form of sequences of bits corresponding to different movements of the boom 3. For example, the templates 31 may include templates $31_1$ corresponding to a single, short tap or tug. The templates 31 may include templates (not shown) corresponding to a single, long tap, two long taps, a short tap followed by a long tap, triple taps and so on. For example, templates corresponding to a single tap include sequences starting with a single '1' or a string of consecutive '1's with no further '1's in the same frame. Short and long taps may be distinguished by the number or total duration of '1's in the string. The templates 31 may describe movement of the boom 3 in other ways.

In this example, the table 21 store commands 32 in the form of a bit code. For instance, taking the example of call-related functions, a code "0001" may represent "Dial a number which is specified by voice" and a code "0010" may represent "Redial the last number". Other commands may include push-to-talk, volume control and so on.

Other ways of identifying a command may be used and the table 21 may be modified to store data in an appropriate form.

Some, or all, of the preceding steps may be performed at another device, such as the external device 22 (FIG. 3).

Referring to FIG. 7, the pivot mechanism 4 includes a cam 33 having a cam surface 34 and a reciprocating member 35 slidably mounted in a holder 36. The cam 33 is rotatably mounted within the main body 2 on a post 37 and the boom 3 is coupled to the cam 33, for example by a fastening means, such as screws, glue or snap-fit fasteners (not shown).

The main body 2 comprises first and second main body portions $38_1$, $38_2$. The post 37 protrudes from an inner surface 39 of the first main body portion $38_1$. A slot 40 protrudes the inner surface 39 for fixing the holder 36 with respect to the cam 33. The sensor 8 is mounted to the first main body portion $38_1$ for detecting flux from a co-operating sensor element, namely a static micro-magnet 29, mounted in the cam 33. As explained earlier, other types of sensors may be used and/or the sensor and if used, co-operating sensor element, may be differently configured.

Referring also to FIG. 8a, the reciprocating member 35 is a pin having a shaft $35_1$ and a head $35_2$, although other shaped members 35, such as a ball may be used. In this example, the pin head $35_2$ is dome-shaped, although other shapes may be used. The pin shaft $35_1$ and the pin head $35_2$ may be unitary.

The holder 36 is in the form of a cylindrical sleeve. The holder 36 is arranged to guide the pin axially with respect to the axis of rotation of the cam 33.

The pin 35 is resiliently biased towards the cam 33 by resilient element 41. In this example, the resilient element 41 is in the form of a compression spring. Thus, the pin head $35_2$ is urged against cam surface 34. The amount of force the pin head $35_2$ exerts on the cam surface 34 is dependent upon the compression of the resilient element 41.

The pin 35 is made out of a substantially incompressible material, such as a metal or a stiff plastics material. The pin head $35_2$ is formed from a material having a low coefficient of friction, such as polytetrafluoroethylene (PTFE).

In FIG. 8a, the cam 33 is shown when the boom 3 is in the OFF position (FIG. 2). The pin 35 sits in a first recess $42_1$ having a first arcuate surface $43_1$ and abuts against a first shoulder $44_1$ of the cam surface 34 which provides a stop for preventing rotation of the cam 33 in one rotational direction, in this example the anticlockwise direction. However, the cam 33 can rotate in the other rotational direction, with the pin head $35_1$ sliding up a first ramped surface $45_1$, over a second arcuate surface $43_2$ and down a second ramped surface $45_2$, into a second recess $42_2$ having a third arcuate surface $43_3$ for positioning the boom 3 in the ON position (FIG. 2).

The cam 33 can continue to rotate with the pin head $35_1$ sliding up a third ramped surface $45_3$, over a fourth arcuate surface $43_4$ and down a fourth ramped surface $45_4$, into a third recess $42_3$ for positioning the boom 3 in the ACTIVE position (FIG. 2).

In FIG. 8b, the cam 33 is shown when the boom 3 is in the ACTIVE position (FIG. 2). The pin 35 sits in the third recess $42_3$ at a foot 46 of a fifth ramped surface $45_5$.

The cam 33 can continue to rotate with the pin head $35_1$ sliding up the fifth ramped surface $45_5$ until it abuts against a second shoulder $44_2$ which provides a stop for further preventing rotation of the cam 33, i.e. further clockwise rotation, and for positioning the boom 3 in the FUNCTION position.

In FIG. 8c, the cam 24 is shown when the boom 3 is in the FUNCTION position (FIG. 2).

If turning force is removed, the compression spring 41 and the fifth ramped surface $45_5$ causes the cam 33 to counter-rotate and return from the unstable FUNCTION position to the stable ACTIVE position.

The slope of the fifth ramped surface $45_5$ may be increased so as to increase the resilient bias.

Other pivot mechanisms 4 may be used. For example, the boom 3 may be mounted on a post, such as post 37, connected via a torsional spring (not shown). Other pivot mechanisms may use leaf or buckling springs.

Movement between a first and second position need not be rotational but may be translational. For example, the boom 3 may pivot to the ACTIVE position, then translate, such as move downwardly, to the FUNCTION position.

Figure 9A:
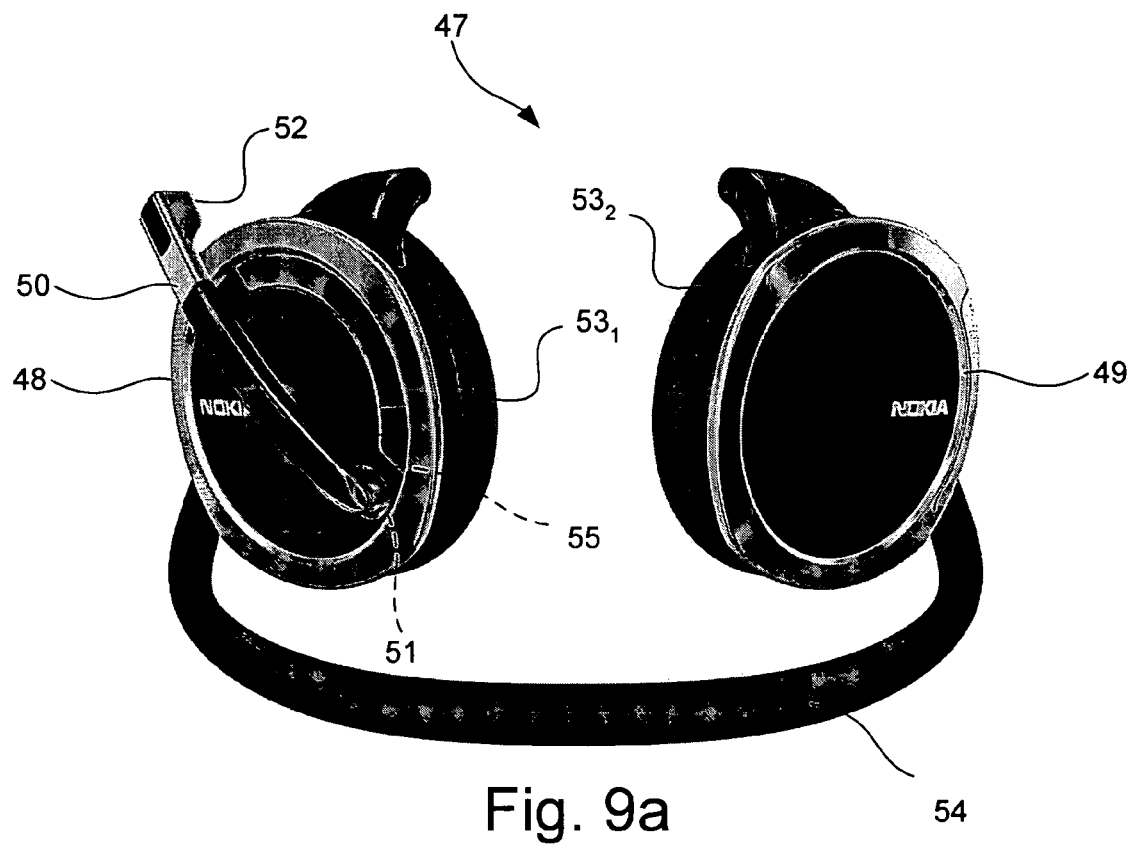
FIG. 9a shows a front perspective view of a second headset in accordance with the present invention in an ON position.
Figure 9B:
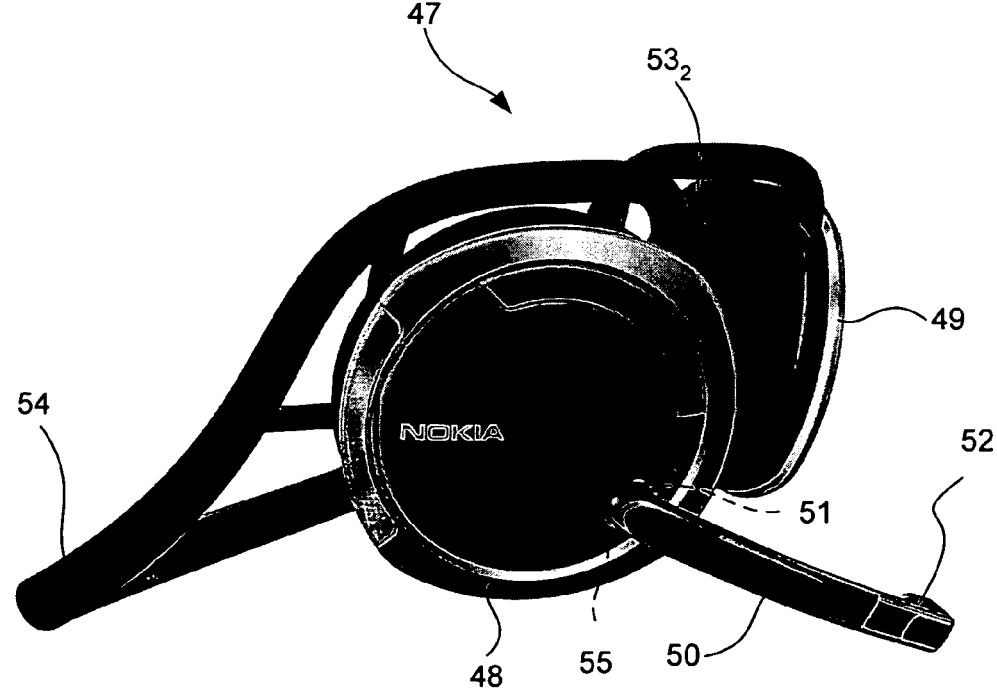
FIG. 9b shows a side view of the headset shown in FIG. 9a in an ACTIVE position.

Referring to FIGS. 9a and 9b, a second headset 47 in accordance with the present invention is shown.

The headset 47 includes a first headphone body 48, which provides a first headset portion, a second headphone body 49, and a boom 50, which provides a second, elongate headset portion, and which is coupled to the first headphone body 48. The boom 50 is coupled to the first headphone body 48 by means of a pivot mechanism 51, which may be similar to that described in the first embodiment of the invention. The headset 47 includes a microphone provided at a distal end of the boom 50, first and second speakers $53_1$, $53_2$ provided in the first and second headphone bodies 48, 49 and a head band 54 disposed between the first and second headphone bodies 48, 49 for securing the headset 47 to a head of a user. The headset 47 includes a sensor 55 for detecting movement of or application of force to the boom 50 in a similar way to that described earlier.

In FIG. 9a, the boom 50 is shown in an ON position. In FIG. 9b, the boom 50 is shown in an ACTIVE position.

Figure 10A:
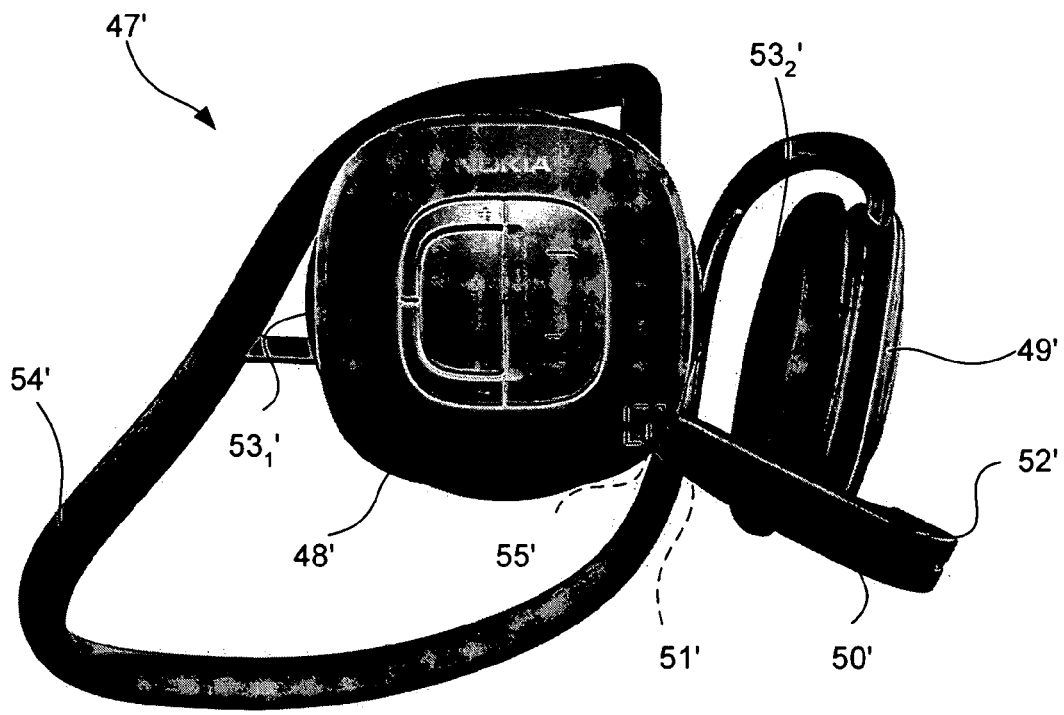
FIG. 10a shows a side view of a third headset in accordance with the present invention in an ACTIVE position.
Figure 10B:
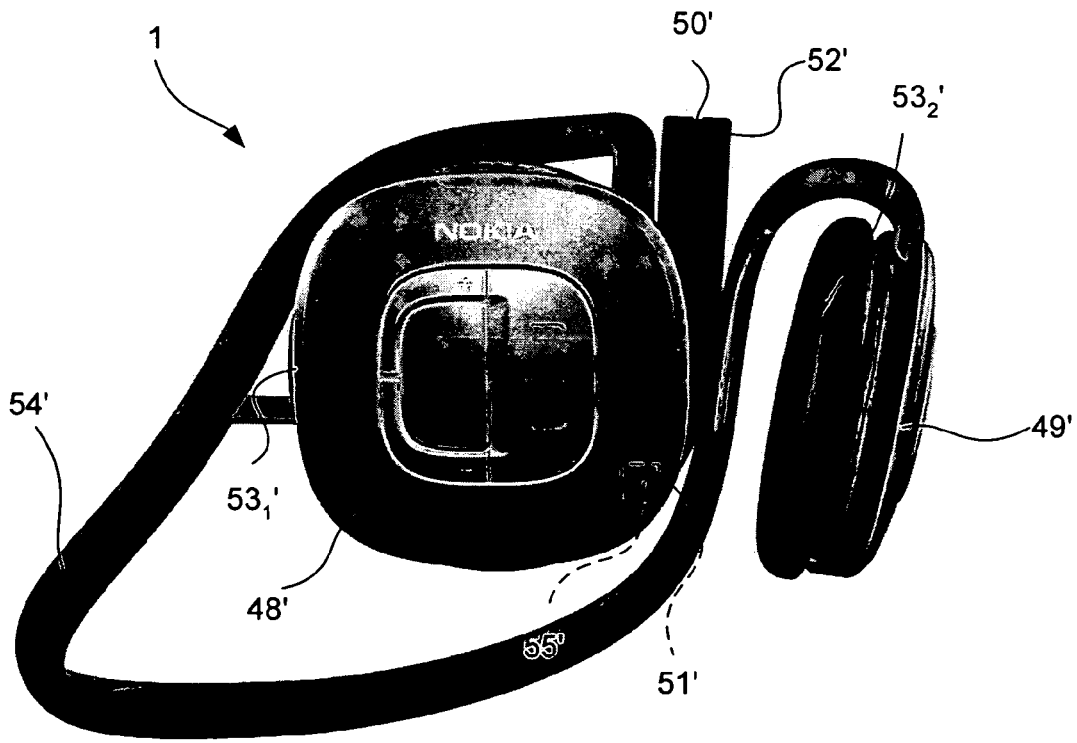
FIG. 10b shows a side view of the headset shown in FIG. 10a in an ON position.
Figure 10C:
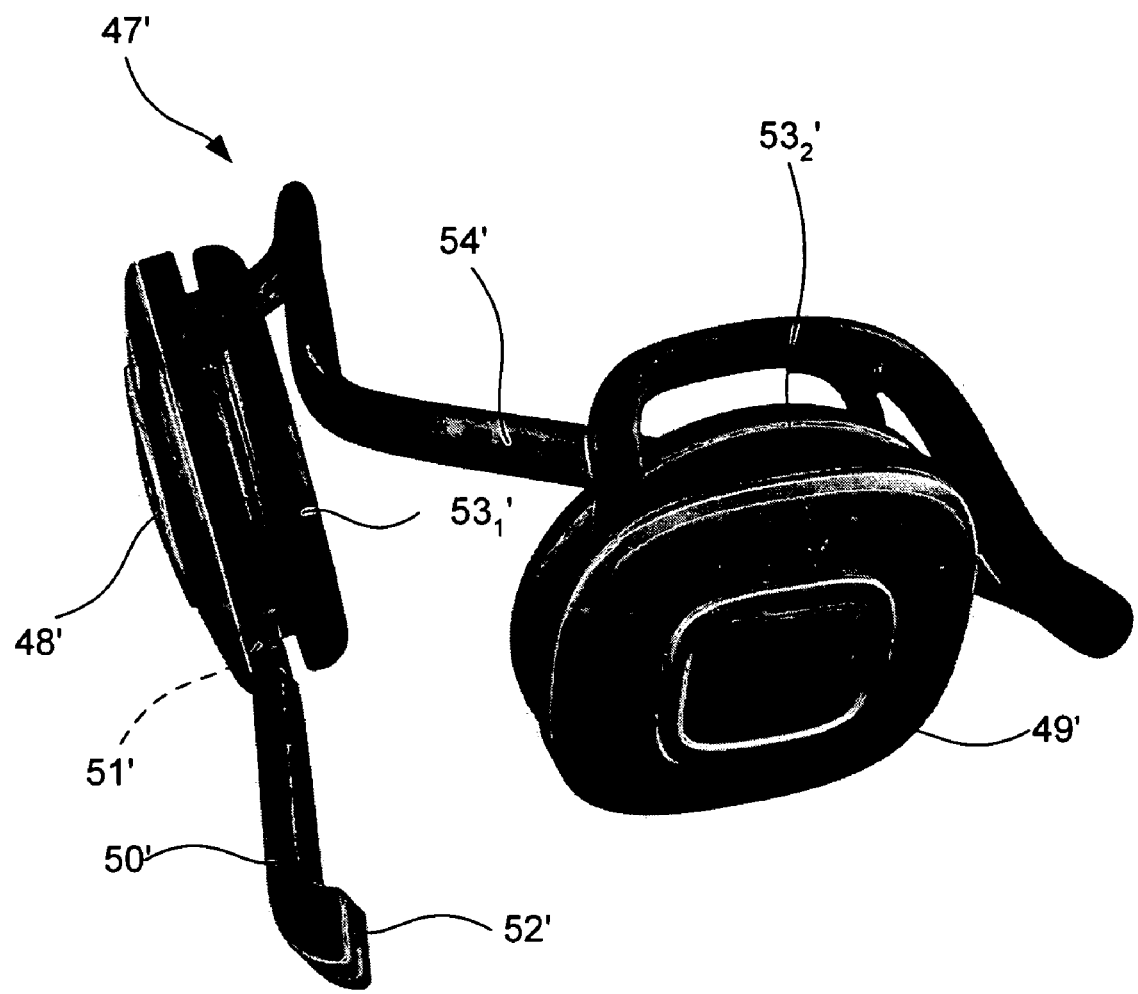

Referring to FIGS. 10a, 10b and 10c, a third headset 47' in accordance with the present invention is shown.

The headset 47' includes a first headphone body 48', which provides a first headset portion, a second headphone body 49', and a boom 50', which provides a second, elongate headset portion, and which is coupled to the first headphone body 48'. The boom 50' is coupled to the first headphone body 48 by means of a pivot mechanism 51', which may be similar to that described in the first embodiment of the invention. The headset 47' includes a microphone 52' provided at a distal end of the boom 50', first and second speakers $53_1$', $53_2$' provided in the first and second headphone bodies 48', 49' and a head band 54' disposed between the first and second headphone bodies 48', 49' for securing the headset 47' to a head of a user. The headset 47' includes a sensor 55' for detecting movement or application of force of the boom 50' in a similar way to that described earlier.

In FIGS. 10a and 10c, the boom 50' is shown in an ACTIVE position. In FIG. 10b, the boom 50' is shown in an ON position.

It will be appreciated that many other modifications may be made to the embodiments hereinbefore described. Such modifications may involve other features which are already known in the art of headsets and which may be used instead of or in addition to features already described herein.

The controller, antenna, transceiver, codec, amplifiers, volatile memory, non-volatile memory and/or a battery may be omitted, particularly if the headset is configured to communicate via a wired link (not shown). Thus, functions performed by an element in the headset may be performed by a corresponding element provided by the external device. More than one boom may be provided. For example, a microphone may be provided on one boom, which may or may not be fixed and which may or may not provide a control column, and a second boom may provide a control column. The boom may be articulated, for example having an elbow. The sensor may be configured to detect an absolute position of the boom, a relative position of the boom and/or motion of the boom. The sensor may detect movement between the ACTIVE and the FUNCTION position, for example by sensing whether the boom is in the ACTIVE position, in the FUNCTION position and/or in a position between the ACTIVE and the FUNCTION position. The sensor may detect movement between the ACTIVE and the FUNCTION position, for example by sensing whether the boom is leaving or arriving the ACTIVE position, leaving or arriving the FUNCTION position or passing through a position between the ACTIVE and the FUNCTION position.

Although claims have been formulated to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A headset comprising:
a first headset portion;
a second, elongate headset portion coupled to the first headset portion,
wherein the second, elongate headset portion is resiliently biased from a first, unstable position relative to the first headset portion towards a second, stable position relative to the first headset portion, and
is configured to be displaced from the second, stable position to the first, unstable position and to return, as a consequence of resilient bias, to the second, stable position from the first, unstable position in response to application of an external tap force;
a sensor configured to detect movement of the second, elongate headset portion relative to the first headset portion; and
a controller configured to determine a command associated with the detected movement of the second, elongate headset portion from the second, stable position to the first, unstable position and to control a transmitter to transmit the determined command to a mobile communications device, different from the headset.

2. A headset according to claim 1, wherein the second, elongate headset portion is pivotably coupled to the first headset portion.

3. A headset according to claim 1, wherein the first headset portion comprises a main body and the second, elongate headset portion comprises a boom.

4. A headset according to claim 1, wherein the first headset portion comprises an ear clip and the second, elongate headset portion comprises a main body.

5. A headset according to claim 4, wherein a boom is coupled to the main body.

6. A headset according to claim 5, wherein the boom is fixedly connected to the main body.

7. A headset according to claim 1, wherein the controller is configured to control the transmitter to transmit the command in response to a sequence of movements of the second, elongate headset portion.

8. A headset according to claim 7, wherein the headset includes the transmitter configured to transmit the command to the mobile communications device.

9. A headset according to claim 1, wherein the headset is in the form of headphones comprising a first headphone body for a first ear and a second headphone body for a second ear, wherein the first headphone body provides the first headset portion.

10. A headset as claimed in claim 1, wherein the second, elongate portion is movable from a first position towards a second, active position; the sensor is configured to detect movement of the second, elongate headset portion between the second, active position and a third position; and the controller is configured to control the transmitter to transmit the command to the mobile communications device in response to detected movement of the elongate headset portion between the second, active position and the third position.

11. A headset as claimed in claim 10, wherein the second, elongate headset portion is resiliently biased from the third position towards the second, active position; the sensor is configured to detect movement of the second headset portion from the second, active position to the third position; and the controller is configured to control the transmitter to transmit the command to the mobile communications device in response to detected movement of the second, elongate headset portion from the second, active position to the third position.

12. A headset as claimed in claim 10, wherein the second, active position is interposed between the first position and the third position.

13. A headset as claimed in claim 10, wherein the controller is configured, when the second elongate headset portion is in the second position, to automatically provide a further command to the mobile communications device on behalf of the user.

14. A headset as claimed in claim 13, wherein the mobile communications device is operable as a telephone and the further command is for answering an incoming call.

15. A headset according to claim 1, wherein the command causes the mobile communications device to participate in a telephone call.

16. A headset according to claim 1, wherein the detected one of the plurality of movements comprises a sequence of movements of the second elongate headset portion.

17. A method according to claim 1, wherein said detecting movement comprises detecting movements which take the form of sequences of bits.

18. A method according to claim 17, wherein said movements which take the form of sequences of bits are movements caused by one of the following: two taps; a short tap followed by a long tap, a long tap followed by a short tap and triple taps.

19. A system comprising:
a headset of claim 1 and a mobile communications device operatively coupleable to the headset.

20. A headset comprising:
a first headset portion;
a second, elongate headset portion,
    wherein the second, elongate headset portion is resiliently biased from a first, unstable position relative to the first headset portion towards a second, stable position relative to the first headset portion, and
    is configured to be displaced from the second, stable position to the first, unstable position and to return, as a consequence of resilient bias, to the second, stable position from the first, unstable position in response to application of an external tap force;
detecting means for detecting movement of the second, elongate headset portion relative to the first headset portion; and
control means for determining a command associated with the detected movement of the second, elongate headset portion from the second, stable position to the first, unstable position and to control transmission means to transmit the determined command to a mobile communications device, different from the headset.

21. A headset as claimed in claim 20, wherein the second, elongate portion is movable from a first position towards a second, active position; the detecting means is for detecting movement of the second, elongate headset portion between the second, active position and a third position; and the control means is for controlling the transmission means to transmit the command in response to detected movement of the second, elongate headset portion between the second, active position and the third position.

22. A headset as claimed in claim 21, wherein the second, elongate headset portion is resiliently biased from the third position towards the second, active position; the detecting means is for detecting movement of the second headset portion from the second, active position to the third position; and the control means is for controlling the transmission means to transmit the command to the mobile communications device in response to detected movement of the second, elongate headset portion from the second, active position to the third position.

23. A method comprising:
detecting movement of an elongate headset portion of a headset relative to a first headset portion, wherein the elongate headset portion is coupled to the first headset portion,
    wherein the elongate headset portion is resiliently biased from a first, unstable position relative to the first headset portion towards a second, stable position relative to the first headset portion, and
    is configured to be displaced from the second, stable position to the first, unstable position and to return, as a consequence of resilient bias, to the second, stable position from the first, unstable position in response to application of an external tap force; and
using a processor to determine a command associated with the detected movement of the elongate headset portion from the second, stable position to the first, unstable position, and to control a transmitter to transmit the determined command to a mobile communications device, different from the headset.

24. A method according to claim 23, wherein the command is for causing the mobile communications device to perform a call-related function.

25. A method according to claim 23, wherein detecting movement of the elongate headset portion comprises detecting movement of the elongate headset portion relative to another headset portion.

26. A method according to claim 23, wherein detecting movement of the elongate headset portion comprises detecting application of a force to the elongate headset portion.

27. A method according to claim 23, wherein said detecting movement comprises detecting movement of the second, elongate headset portion, caused by tugging, tapping, stroking or twisting the second, elongate headset portion.

28. A non-transitory computer readable medium having storing thereon a computer program comprising instructions which, when executed by a processor of a headset having a first headset portion and an elongate headset portion coupled to the first headset portion, wherein the second, elongate headset portion is resiliently biased from a first, unstable position relative to the first headset portion towards a second, stable position relative to the first headset portion, and is configured to be displaced from the second, stable position to the first, unstable position and to return, as a consequence of resilient bias, to the second, stable position from the first, unstable position in response to application of an external tap force, causes the processor of the headset to:
    determine a command associated with a detected movement of the elongate headset portion from the second, stable position to the first, unstable position; and
    control a transmitter to transmit the determined command to a mobile communications device, different from the headset.

29. A non-transitory computer readable medium according to claim 28, wherein the command is for causing the mobile communications device to perform a call-related function.

30. A non-transitory computer readable medium according to claim 28, wherein the command is transmitted in response to detected movement of the elongate headset portion relative to another headset portion.

* * * * *